Jan. 4, 1927.
W. W. GEHERSKY
1,612,806
ADJUSTABLE SPOTLIGHT
Filed Nov. 26, 1921
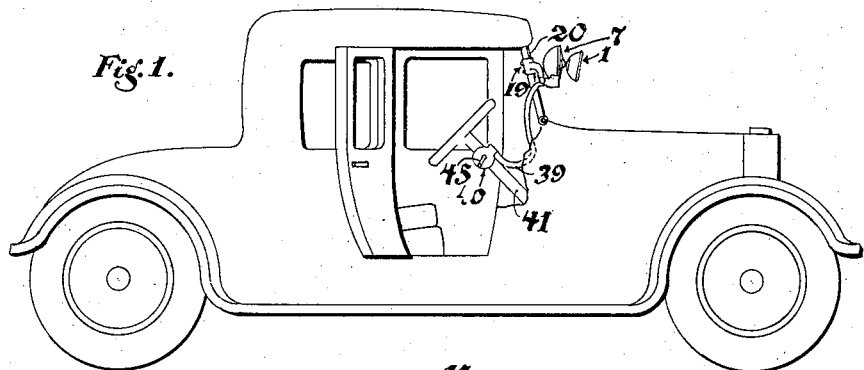
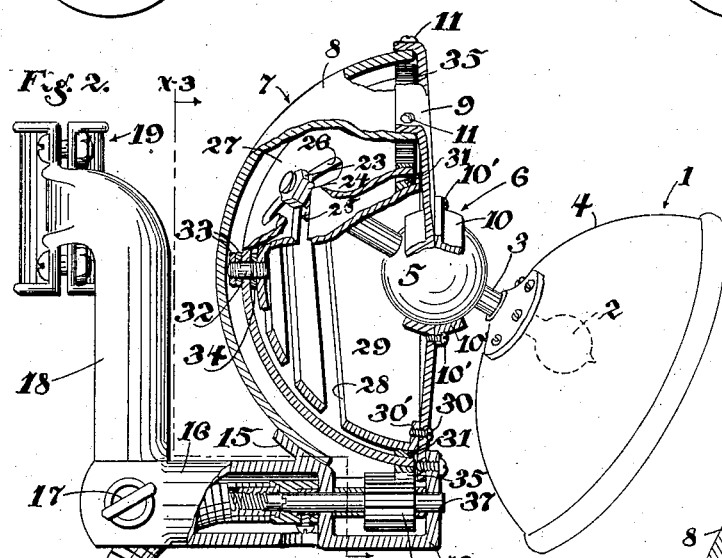
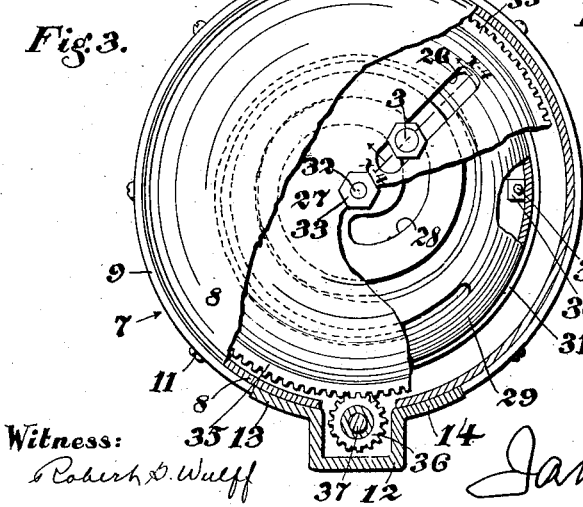
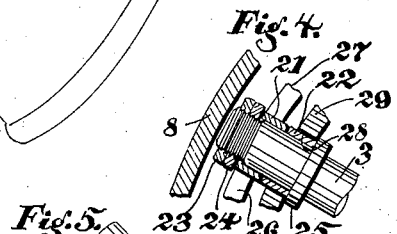
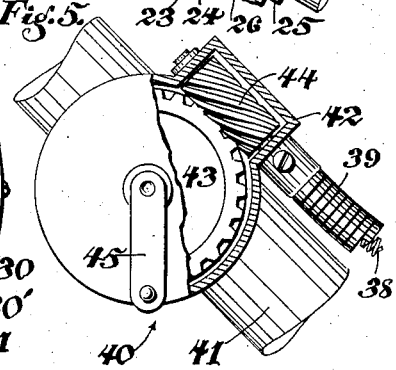
Witness:
Robert D. Wulff
Inventor,
William W. Gehersky
by James R. Townsend
his atty Patented Jan. 4, 1927.

1,612,806

UNITED STATES PATENT OFFICE.

WILLIAM W. GEHERSKY, OF LOS ANGELES, CALIFORNIA, ASSIGNOR OF ONE-HALF TO WILLIAM G. RUPPENCAMP, OF LOS ANGELES, CALIFORNIA.

ADJUSTABLE SPOTLIGHT.

Application filed November 26, 1921. Serial No. 517,981.

This invention relates to spot-lights adapted to be attached to automobiles and similar vehicles and more particularly to means for directing the luminous rays of such spot-light in a predetermined direction, and has for its main object to provide means whereby spot-lights can be adjusted from the tonneau of an automobile without necessitating the driver leaning forward or extending his hand outside of the tonneau.

Another object is to provide a single operating crank for adjusting both horizontal and vertical rays of light.

An advantage is that spot-lights mounted on sedans, coupés, and automobiles provided with wind shields, and the ordinary automobiles well known in the art can be adjusted without having to extend the hand out of windows or around the windshield and thereby eliminates a disagreeable task in inclement weather. This is equally true of ordinary automobiles which have the side curtains in position for various purposes.

A still further advantage is that the driver does not have to change his sitting posture to direct the luminous rays from the spot-light to the desired position and thereby divert his attention from the steering wheel.

Other objects, advantages, and features of invention may appear from the accompany the drawing, the subjoined detail description and the appended claims.

The accompanying drawing illustrates the invention.

Figure 1 is a more or less diagrammatic side view of a spot-light embodying my invention as applied to an automobile having a right hand drive.

Fig. 2 is a side elevation of said spot-light, portions being broken away for purposes of clearness and to contract the view.

Fig. 3 is a section on line $x^3$—$x^3$, Fig. 2, portions being broken away for purposes of clearness.

Fig. 4 is an enlarged detail sectional view on line $x^4$, Fig. 3.

Fig. 5 is a detail side elevation partly in section showing the operating means attached to a portion of the steering post of an automobile.

The spot-light lamp 1 may be of any approved form and size, and comprises the usual reflector casing which has mounted therein the usual incandescent bulb 2. A stem 3 is secured at one end in any well known way to the casing 4 of the spot-light lamp 1. A ball 5 is fixed to the stem 3 intermediate its ends and is mounted in a ball socket 6 formed in the housing 7 which comprises a main semi-spherical housing member 8 and a covering member 9 thereby permitting practically universal movement of said stem. A cap member 10 is secured to said covering member by means of screws 10′ and is adapted to hold the ball 5 in the ball socket. The covering member 9 is secured to the main housing member 8 by means of screws 11.

The bearing box or gear case 12 has flanges 13, 14, 15 extending therefrom, and secured to the main housing member 8 by any well known means such as brazing. An arm 16 extends rearwardly from said bearing box and is pivotally connected as at 17 to a hanger 18 which has a clamp 19 adapted to be fastened to the frame 20 of a windshield.

The other end of the stem 3 has the sleeves or rollers 21, 22 rotatably mounted thereon, and lock nuts 23, 24 and a collar 25 hold said rollers in operative position with the adjusting means comprising semi-spherical outer and inner shells 27, 29. The roller 21 is adapted to slide in the axial slot or slideway 26 formed in the rotatable outer shell 27, and the roller 22 is adapted to slide in the helical slot or slideway 28 formed in the stationary inner shell 29 that is fixed to the covering member by means of screws 30 and lugs 30′ which extend inwardly from the perimeter of the shell. A spacing member 31 is fixed to the outer perimeter which is adapted to hold the outer shell 27 in true alinement with the inner shell 29. The outer shell 27 is rotatably secured to the inner shell by means of a stud bolt 32 and nuts 33 secured thereon.

A collar 34 is secured to the inner shell 29 and is adapted to receive the stud bolt 32, and also serves to space the outer shell from the inner shell 27.

Said outer shell has gear teeth 35 adapted to mesh with a pinion 36 secured to a shaft 37, which is mounted in the bearing box 12.

The flexible shaft 38 in the shaft tubing 39 is adapted to be secured at one end to the shaft 37 in any well known way. The flexible shaft extends into the tonneau of the automobile and has on its inner end the operating means 40 that comprises a housing 42 which is adapted to be attached to a steering post 41 and has rotatably mounted therein gears 43, 44, the latter of which is fixed to the controlling end of the flexible shaft 38. A crank 45 is adapted to operate the operating means.

In practical operation, when it is desired to change the direction of the luminous rays of the spot-light, the crank 45 of the operating means will be rotated, which in turn will rotate the flexible shaft pinion 36 and outer shell 27. The outer shell 27 will cause the stem 3 to follow the helical slot or slideway 28 of the inner shell, and such axial change of position, by the adjusting means, of the stem 3 which is pivotally connected to the housing will cause the luminous rays to be practically directed in line with the projecting axis of said stem.

The rays of light may be directed in practically any direction that is desired without the driver having to lean forward in the seat to enable him to reach the spot-light for changing its direction.

I claim.

1. The combination in a spot-light having a casing, of a stem secured to said casing; a housing comprising main and covering housing members; a ball on said stem and mounted in said housing; an inner shell provided with a slot and fixed to said housing; an outer shell provided with a slot and rotatably mounted in said housing; the slots of said inner and outer shell being adapted to receive said stem; gear teeth on said outer shell; a pinion meshing with said gear teeth; and means connected to said pinion and operable from the tonneau of an automobile for rotating said outer shell.

2. The combination in a spot-light having a casing, of a stem secured to said casing; a housing comprising main and covering housing members; a ball on said stem and mounted in said housing; an inner shell provided with a slot and fixed to said housing; an outer shell provided with a slot and rotatably mounted on and spaced apart from said inner shell; the slots of said inner and outer shell being adapted to receive said stem; gear teeth on said outer shell; a pinion meshing with said gear teeth; and means connected to said pinion and operable from the tonneau of an automobile for rotating said outer shell.

3. The spot-light positioning means composed of a housing and a stem fixed to the casing of a lamp and pivotally connected to said housing; a rotatable and a stationary shell provided with axial and helical slots respectively, and adapted to receive said stem; and means for rotating said rotatable shell so as to change the direction of light emitting from said lamp.

4. The spot-light positioning means composed of a housing and a stem fixed to the casing of a lamp and pivotally connected to said housing; a rotatable and a stationary shell provided with slots adapted to receive said stem, and means for rotating said rotatable shell so as to change the direction of light emitting from said lamp.

5. The spot-light positioning means composed of a housing and a stem fixed to the casing of a lamp and pivotally connected to said housing; a rotatable and a stationary shell provided with slots adapted to receive said stem; and means for rotating said rotatable shell so as to change the direction of light emitting from said lamp, said means being operable from the tonneau of a car.

6. The spot-light positioning means composed of a housing and a stem fixed to the casing of a lamp and pivotally connected to said housing; a rotatable and a stationary shell provided with axial and helical slots respectively, and adapted to receive said stem; and means for rotating said rotatable shell so as to change the direction of light from said lamp, said means comprising a housing adapted to be attached to a steering post, gears in said housing, and a flexible shaft attached to one of said gears and operably connected to said rotatable shell.

7. The combination in a spot-light having a lamp provided with a casing, a stem fixed to said casing and having a ball thereon; a housing having a ball socket and pivotally connecting said stem to said housing; rotatable and stationary shells each provided with a slot adapted to receive said stem, and means for rotating said rotatable shell so as to vary the direction of light.

8. The spot light positioning means comprising a housing adapted to be attached to an automobile, a lamp, a stem secured to the lamp and being mounted intermediate its ends for universal movement in said housing; adjusting means in said housing and engaging said stem, and comprising a rotatable and a stationary shell, said shells having openings therein through which said stem extends; and means adapted to operate said adjusting means so as to change the direction of light.

9. A spot light positioning mechanism comprising a lamp, a stem secured to the lamp; a housing in which said stem is pivotally mounted; and adjusting means comprising a rotatable and a stationary shell, said shells having cooperating openings therein through which said stem extends, said means being adapted to adjust the axial position of said stem so as to change the direction of light emitting from said lamp, said means being operable from the tonneau of an automobile to actuate said adjusting means.

10. An adjustable spot light comprising a lamp, a semi-spherical housing; a stem secured to said lamp and being pivotally mounted in said housing, means including a semi-spherical shell rotatably mounted in said housing, and engaging said stem; and means for rotating said shell to change the direction of light from said lamp.

11. An adjustable spot light comprising a lamp, a housing, a stem secured to said lamp and being mounted in said housing, means including a shell in said housing provided with gear teeth and engaging said stem; and means engaging said gear teeth to rotate said shell so as to change the direction of light emitting from said lamp.

In testimony whereof, I have hereunto set my hand at Los Angeles, California, this 18th day of November, 1921.

WILLIAM W. GEHERSKY.